Patented Aug. 13, 1935

2,011,184

UNITED STATES PATENT OFFICE 2,011,184

ROLLER BEARING

Frederick W. Peters, Cleveland, Ohio

Original application February 21, 1933, Serial No. 657,809, now Patent No. 1,972,355, dated September 4, 1934. Divided and this application July 19, 1934, Serial No. 736,057

2 Claims. (Cl. 308—206)

This invention relates to roller bearings, and has for its general object to provide such a bearing which will operate with a minimum of friction and which will embody a very efficient construction of roller bearings and retaining means for such bearings, whereby they may operate as the sole retainers for an otherwise fully floating sleeve member.

A further object is the provision of a roller bearing assembly of the type indicated which will embody alternating large and small rollers and provide novel retaining and thrust means for the roller assembly.

Figure 1:
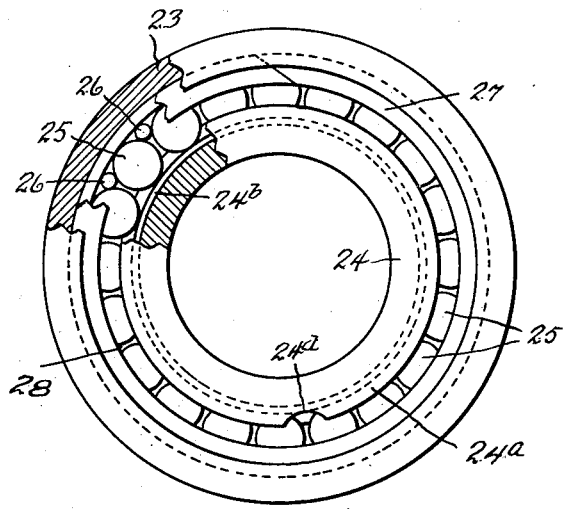
Figure 2:
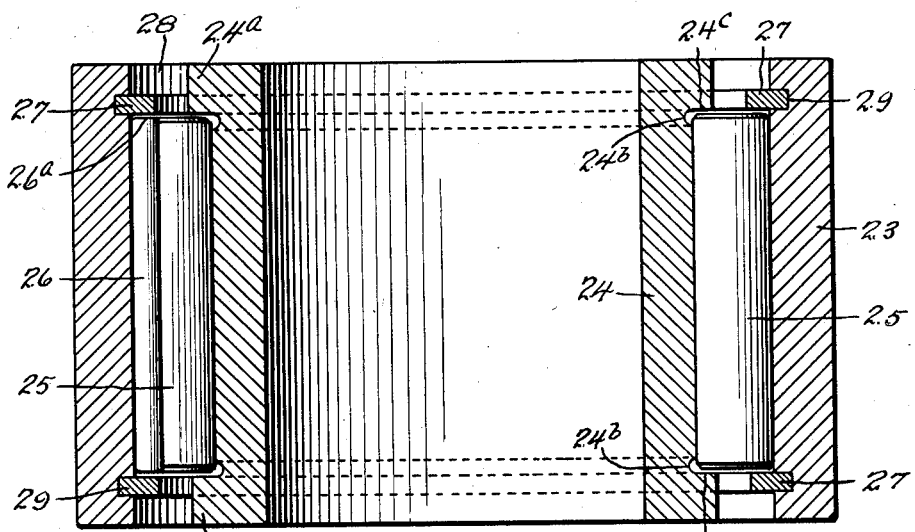

Other and more limited objects will appear from the following description when taken in connection with the accompanying drawing wherein Fig. 1 is an end elevation with a portion broken away and Fig. 2 is a central longitudinal section, the device embodying my invention.

Referring now to the drawing, the numeral 23 indicates an outer sleeve member within which is a floating inner sleeve member 24. Between the sleeves 23 and 24 are a plurality of large rollers 25 alternating with which are an equal number of small rollers 26. The small rollers 26 may be placed so as to contact the adjacent large rollers and either of the sleeves 23 or 24. It will be understood that there will be working contact between the small rollers and adjacent large rollers and that the rollers are of such sizes that the large ones are slightly spaced apart, for example from one to two one-thousandths of an inch. The diameters of the rollers will be such that there will be a sufficient clearance for insertion of the rollers longitudinally between the sleeve members.

A pair of split retaining rings 27 composed of spring metal may be compressed and caused to overlap at their ends so as to be introduced into the space 28 between the sleeves 23 and 24 and allowed to expand and seat themselves in the grooves 29.

The inner sleeve 24 is provided with flanges 24ª extending outwardly and adapted to receive therebetween the rollers 25. At the corner formed between the bearing surface of the inner sleeve 24 and the flanges 24ª are grinding cuts 24ᵇ. It will be noted that the inner surface of the rings 27 are in the same plane with the inner surfaces 24ᶜ of the flanges 24ª. It will be understood that the length of the rollers is such as to allow free working clearance. It will also be noted that the split rings 27 extend over the ends of the large rollers 25 and form a retaining means for the smaller rollers 26. In the event the smaller rollers 26 should be placed in position to contact the inner sleeve 24 instead of the outer sleeve 23 as shown, the flanges 24ª will form retaining means therefor.

In assembling, one of the rings 27 is preferably placed in position in one of the grooves 29 after which the inner sleeve is partially inserted into the outer sleeve and the rollers are then inserted between the sleeves. The inner sleeve is then brought to the relative position shown in Fig. 2 and the other ring 27 is compressed and introduced through the space 28 into the position shown, alternatively the lower ring 27 may be placed in its groove, the sleeves 23 and 24 placed in the relative position shown in Fig. 2 and the large rollers 25 inserted through a notch 24ᵈ in the flange 24ª, the small rollers 26 inserted through the space 28 between the large rollers and the upper ring 27 then inserted. It will be understood that in the first method of assembly the notch 24ᵈ is omitted.

This application is a division of my copending application Serial No. 657,809, filed February 21, 1933, Patent No. 1,972,355 issued September 4, 1934.

Having thus described my invention, what I claim is:

1. In a bearing, the combination of an inner journal sleeve member and an outer sleeve member, a plurality of spaced rollers interposed between the said members, a plurality of smaller rollers interposed between the first mentioned rollers and one of the said members, each of the smaller rollers being in rolling engagement with the two larger rollers adjacent thereto, the inner member having at an end thereof a radially outwardly projecting extension, said extension having at its inner end an annular surface, the outer sleeve member being provided adjacent to its corresponding end with a radially outwardly projecting recess, and a contractible and expansible ring seated in the recess and having an inner annular surface cooperating with the inner annular surface of the extension to provide therewith retaining means for the said rollers.

2. In a bearing, the combination of an inner journal sleeve member and an outer sleeve member, a plurality of spaced rollers interposed between the said members, a plurality of smaller rollers interposed between one of said members and the first mentioned rollers and each in rolling engagement with the two larger rollers adjacent thereto, the inner member being provided adjacent each end thereof with a radially outwardly projecting annular surface adapted to engage the ends of the rollers interposed between the ends of the first mentioned rollers, the outer member being provided with a radially inwardly projecting annular surface at one end thereof cooperating with the corresponding annular surface of the inner member to engage the adjacent ends of the first mentioned rollers, and the outer member being provided adjacent the opposite end thereof with an insertible and removable ring having a radially inwardly annular surface adjacent the corresponding annular surface at the adjacent end of the inner member to provide means for retaining the rollers between said members.

FREDERICK W. PETERS.